United States Patent [19]

Evans

[11] 4,348,531

[45] Sep. 7, 1982

[54] FLUOROSILICONE POLYDIMETHYLSILOXANE EQUILIBRATION CHAINSTOPPER AND PROCESS FOR MANUFACTURE

[75] Inventor: Edwin R. Evans, Saratoga, N.Y.

[73] Assignee: General Electric Company, Waterford, N.Y.

[21] Appl. No.: 249,785

[22] Filed: Apr. 1, 1981

Related U.S. Application Data

[63] Continuation of Ser. No. 71,152, Aug. 30, 1979, abandoned.

[51] Int. Cl.$^3$ .................................................. C07F 7/02
[52] U.S. Cl. ........................................ 556/453; 528/14; 528/37; 528/32; 528/42; 556/462; 556/467; 556/450
[58] Field of Search ................. 528/37, 42, 14, 32; 556/467, 462, 450; 524/588; 556/453

[56] References Cited

U.S. PATENT DOCUMENTS

| | | | |
|---|---|---|---|
| 3,002,951 | 10/1961 | Johanson | 528/10 |
| 3,050,492 | 8/1962 | Polmanteer et al. | 528/34 |
| 3,937,684 | 2/1976 | Razzano | 260/45.75 R |
| 3,974,120 | 8/1976 | Razzano et al. | 260/30.4 SB |
| 3,978,104 | 8/1976 | Razzano et al. | 528/10 |
| 3,997,496 | 12/1976 | Razzano | 528/10 |
| 4,028,338 | 6/1977 | Razzano | 528/10 |
| 4,029,629 | 6/1977 | Jeram | 528/42 |
| 4,041,010 | 8/1977 | Jeram | 528/37 |
| 4,089,833 | 5/1978 | Simpson | 260/37 SB |
| 4,111,973 | 9/1978 | Bluestein | 528/10 |
| 4,122,247 | 10/1978 | Evans | 528/37 |
| 4,122,247 | 10/1978 | Evans | 528/14 |

*Primary Examiner*—Melvyn I. Marquis
*Attorney, Agent, or Firm*—E. Philip Koltos

[57] ABSTRACT

A fluorosilicone polydimethylsiloxane equilibration chainstopper and process for making same are disclosed. The chainstopper has a fluorosilicone content in the range of 30 mole percent to 60 mole percent and is a preferred chainstopper in equilibration reactions in the production of vinyl-stopped fluorosilicone polydimethylsiloxane copolymers.

4 Claims, No Drawings

FLUOROSILICONE POLYDIMETHYLSILOXANE EQUILIBRATION CHAINSTOPPER AND PROCESS FOR MANUFACTURE

This is a continuation of application Ser. No. 71,152, filed Aug. 30, 1979 and now abandoned.

This invention relates to fluorosilicone-containing chainstoppers, and more particularly to a new and improved fluorosilicone polydimethylsiloxane especially adapted for use as a chainstopper in producing low energy molding (LEM) copolymers and a process for manufacturing such chainstoppers.

BACKGROUND OF THE INVENTION

There has long been a need for inexpensive chainstoppers that can be derived from standard intermediates, such, for example, as $[(CH_3)_2SiO]_4$ and $[CF_3(CH_2)_2Si(CH_3)O]_3$, and which can be produced through equilibration and with the use of a readily available catalyst such as potassium hydroxide. Such a chainstopper is desirable for use in the production of vinyl-stopped fluorosilicone polydimethylsiloxane copolymer compositions. Additionally, it is applicable in the reworking of certain out-of-specification low energy molding (LEM) copolymers wherein, for example, the mole percent fluorosilicone content may be too low, where vinyl end groups may need to be re-established, or where the viscosity must be reduced for a particular application.

Applicant has provided a fluorosilicone polydimethylsiloxane equilibration chainstopper and process for making same which involves the manufacture of a fluorosilicone chainstopper having a fluorosilicone content in a range which particularly adapts the chainstopper for the above-discussed purposes.

More particularly, the primary object of this invention is to provide a novel fluorosilicone polydimethylsiloxane chainstopper having a mole percent fluorosilicone content which especially adapts it for use in producing low energy molding copolymers.

Another object is to provide a new and improved fluorosilicone chainstopper which is readily prepared with the use of standard intermediates and thus enables selection of materials from a broader base of usable starting materials and enables reduced production costs.

An additional object is to provide a fluorosilicone polydimethylsiloxane chainstopper especially effective in the preparation of high fluorosilicone content copolymer fluids.

Yet another object is to provide a new and improved fluorosilicone polydimethylsiloxane chainstopper useful for reducing the molecular weight of high molecular weight copolymers and for re-establishing vinyl-end groups on copolymer chains. A common source of such materials would be out-of-specification copolymers characterized by the absence of essential vinyl-end groups and reduced density which characteristics ordinarily render the out-of-specification copolymers unsatisfactory as base components for low energy molding systems.

The objects of the present invention are met by a fluorosilicone polydimethylsiloxane having a fluorosilicone content within the rane of 30 mole percent to 60 mole percent and the following formula:

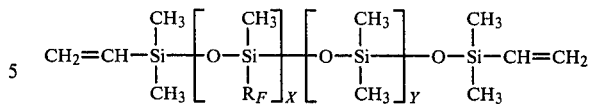

in which $R_F$ is $CF_3CH_2CH_2-$, X is approximately, 10 to 30 and Y is approximately, 20 to 50.

By way of further discussion of the background of the present invention and in order to facilitate understanding of the invention, it is to be noted that in the preparation of low energy molding (LEM) compositions, that is, higher molecular weight copolymers which are used to make heat cured silicone rubbers by means of copolymerization, the particular chainstopper selected for use in terminating the copolymerization process is often determined by the polymerization process to be used. Other factors considered in making the determination are the viscosity desired for the end product, the desired molecular weight of the end product and the preferred mole percent fluorosilicone content of the copolymers being produced.

Copolymers which may be effectively produced with the present invention find utility, for example, in common applications such as in solvent resistant transparent tubing, and in electrical cable receptacle pin sealants and in sealants for aircraft fuel lines. Additionally, such copolymers are often formulated to have a fluorosilicone content of at least 50 mole percent in order to afford a high degree of resistance to aromatic solvents, such as toluene and JP-4 fuel while still maintaining their physical integrity over a temperature range of, for example, $-75°$ C. to $+100°$ C. Furthermore, fluorosilicone polydimethylsiloxane chainstoppers are often used in the preparation of low viscosity (300–1000 centipoise) copolymer and terpolymer fluids to serve as the base for polytetrafluoroethylene (PTFE) containing greases.

DESCRIPTION OF THE INVENTION

The preparation of the fluorosilicone chainstopper of this invention is acccomplished through the polymerization procedure commonly referred to as "equilibration". The term "equilibration" as used herein is intended to mean the reaction that occcurs when a cyclic monomer such as octamethylcyclotetrasiloxane having the formula:

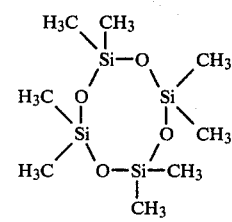

is polymerized with MOH (M is an alkali metal, preferably potassium) catalyst and a monomer such as 3,3,3-trifluoropropylmethylsiloxane cyclic trimer of the formula:

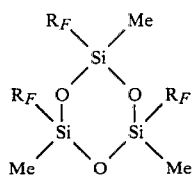

where $R_F$ is $CF_3—CH_2—CH_2—$, and Me is $CH_3—$, and whereby an equilibrium mixture of linear and cyclic products is obtained, with the ratio of the linear to cyclic being approximately 80 percent to approximately 90 percent linear, and approximately, 10 percent to approximately 20 percent cyclics. Additionally, in such resultant mixture the distribution between linear and cyclic is a function of both the polymerization conditions and the nature of the catalyst.

Furthermore, the fluorosilicone chainstopper of the present invention is a low molecular weight fluorosilicone polydimethylsiloxane copolymer containing at least 30 and preferably 30 to 60 mole percent fluorosilicone, derived from starting monomers having different activity coefficients. A mole percent content of at least 30 percent is needed to insure solubility of the chainstopper in the equilibration reaction mixture. Less than a 30 mole percent fluorosilicone content causes phase separation with resulting insolubility of the chainstopper. Greater than 60 mole percent fluorosilicone is without beneficial results and serves as an extravagant use of an expensive cyclic monomer. By definition, the term fluorosilicone means "containing a 3,3,3-trifluoropropylmethylsiloxy moiety". The highly-strained fluorosilicone cyclic trimer opens rapidly with the evolution of exothermically generated heat at from 130° C. to 160° C. Initially, the 3,3,3-trifluoropropylmethylsiloxane cyclic trimer opens and proceeds to form a homopolymer, then as the octamethylcyclotetrasiloxane ring opens and adds to the growing chain, discrete blocks are formed, such as, AAAAA-BBBB. By continuing the polymerization for a period of approximately 10 hours at 160° C., the chain becomes randomized through equilibration.

The fluorosilicone chainstopper containing 30 to 60 mole percent fluorosilicone can be prepared by the base catalyzed equilibration of tetramethyldimethylsiloxane, with octamethylcyclotetrasiloxane cyclic tetramer and 3,3,3-trifluoropropylmethylsiloxane cyclic trimer. The octamethylcyclotetrasiloxane used assures dryness of the admixture of reactants prior to polymerization and to control the amount of methylsiloxane in the product copolymer within the range of from about 40 mole percent to about 80 mole percent. The ingredients utilized are in approximate weight percentages, and the desired reaction can be obtained by using the ingredients and following the procedure indicated below:

| Ingredients | Approximate Weight Percentages |
|---|---|
| Tetramethyldivinyldisiloxane | 11.00 |
| Octamethylcyclotetrasiloxane | 29.2 |
| 3,3,3-trifluoropropylmethyl-siloxane cyclic trimer | 59.8 |
| KOH | 30–50 ppm |
| Phosphoric Acid | Quantity sufficient to neutralize the KOH |

The composition derived from reaction of the above-indicated ingredients was prepared according to the following procedure:

A stainless steel equilibration vessel equipped with a condenser was first purged with nitrogen to exclude moisture and oxygen. The equilibration vessel was then charged with 158 parts octamethylcyclotetrasiloxane plus 30 extra parts for drying and 262 parts, 3,3,3-trifluoropropylmethylsiloxane cyclic trimer with moderate agitation. The contents of the vessel was heated to 150°–160° C. and with a nitrogen purge, the 30 extra parts (in general an excess of octamethylcyclotetrasiloxane of about 10 percent of the charged input will insure dryness below 10 ppm of water) of octamethylcyclotetrasiloxane was removed to reduce the moisture level to less than 10 ppm of water. The vessel temperature was reduced to 115°–125° C. at which point 48.2 parts of tetramethyldivinyldisiloxane, and 0.014 grams of potassium hydroxide (colloided in octamethylcyclotetrasiloxane) were added. The reaction displays an exotherm with the maximum temperature reaching a value over the range of approximately 127° C. to approximately 133° C. When the exotherm starts to subside, the vessel temperature is increased to approximately 145° C. to approximately 150° C. and maintained at said level for 10 hours until the volatile level of the product was less than 20%, the viscosity was between 15 and 22 centistokes, and the product had a density of approximately 1.090 to approximately 1.130 at 25° C. The fluorosilicone chainstopper was then neutralized with phosphoric acid, filtered and stored in clean drums. Analysis indicated the following composition in approximate weight percent and approximate mole percent:

| Component | Wgt. % | M % |
|---|---|---|
| Vi(Me)$_2$SiO | 2.0–5.0 | 2.1–5.2 |
| (Me)$_2$SiO | 30–40 | 50.0–64.0 |
| R$_F$(Me)SiO | 50–60 | 34.0–41.0 |

R$_F$ is $CF_3CH_2CH_2—$,
Vi is $CH_2$=$CH—$, and
Me is $CH_3$

The empirical formula of the resultant fluorosilicone chainstopper was as follows:

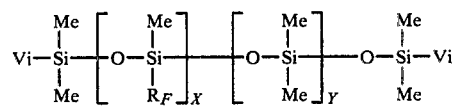

R$_F$ is $CF_3CH_2CH_2$,
Vi is $CH_2$=$CH—$,
X = 22
Y = 38
and Me is $CH_3—$.

In the preparation of fluorosilicone copolymer fluids having a 30 mole percent to 60 mole percent fluorosilicone content, the fluorosilicone chainstopper claimed herein was effectively utilized in the appropriate weight percentages, and following the procedure indicated below:

| Ingredient | Approximate Weight |
|---|---|
| 3,3,3-trifluoropropylmethyl-siloxane cyclic trimer | 1750 g |
| Octamethylcyclotetrasiloxane | 2130 g |
| Fluorosilicone Chainstopper | 271 g |

| Ingredient | Approximate Weight |
|---|---|
| KOH | 30 ppm |
| Phosphoric Acid | Quantity sufficient to neutralize KOH |

The fluorosilicone copolymer derived from the above-indicated ingredients was prepared according to the following procedure:

Into a stainless steel equilibration vessel was charged 1750 grams 3,3,3-trifluoropropylmethylsiloxane cyclic trimer, 2330 grams (includes 200 grams excess for purge drying) of octamethylcyclotetrasiloxane and 271 grams of fluorosilicone chainstopper. The system was heated to approximately, 120° C. and the excess tetramer was purged out with nitrogen to reduce the moisture content to less than 10 ppm of water. The reaction was catalyzed with 0.12 grams of potassium hydroxide (colloided in octamethylcyclotetrasiloxane) at approximately 120° C., the reaction exothermed and when the temperature started to subside (after 4-10 minutes), the vessel temperature was increased to approximately 155° C. to approximately 160° C. and held at said range for approximately seven hours, followed by neutralization with phosphoric acid.

The reaction yielded 3428 grams (83% recovered yield) of copolymer with a viscosity of approximately, 15,000 to approximately 25,000 centipoise and a density of approximately, 1.100 to approximately 1.200 at 25° C.

Utilization of the novel fluorosilicone chainstopper of this invention is effective for reworking out-of-specification copolymers characterized by the absence of essential vinyl-end groups and reduced density. A typical input copolymer appropriate for modification by this process can be characterized by the following empirical formula:

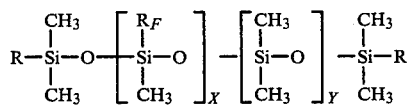

wherein the molecular weight is from above 50,000 to approximately 250,000 and X is equal to approximately 250 to approximately 1200, Y is equal to approximately 200 to approximately 1150, and R is $CH_3$—, $CH_2$=CH—, or OH, and $R_F$ is $CF_3CH_2CH_2$—.

The copolymer, after processing according to this invention, will have the same basic formula except that X is approximately 185 to approximately 200, Y is approximately 180 to approximately 195 giving a total molecular weight of about 40,000 to about 50,000 and R is $CH_2$=CH—.

A typical admixture useful in the process comprises:

| Ingredient | Approximate Parts by Weight |
|---|---|
| 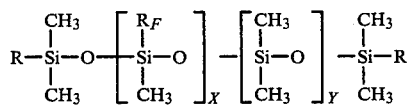 | 100 |
| 3,3,3-trifluoropropylmethylsiloxane | 10-40 |
| Octamethylcyclotetrasiloxane | 2-20 |
| Fluorosilicone chainstopper | 1-15 | wherein the copolymer first listed has a molecular weight of from about 50,000 to approximately 250,000 and X is equal to approximately 250 to approximately 1200, Y is equal to approximately 200 to approximately 1150, R is $CH_3$—, $CH_2$=CH—, or OH, and $R_F$ is $CF_3CH_2CH_2$—.

The following is an example of the procedure for using the fluorosilicone chainstopper in reworking an out-of-specification copolymer. The ingredients are given in approximate weight percentages, and the procedure is outlined below:

| Ingredient | Approximate Weight |
|---|---|
| 50 m % FS copolymer | 2290 g |
| 3,3,3-trifluoropropylmethylsiloxane cyclic trimer | 733-770 g |
| Octamethylcyclotetrasiloxane | 160 g |
| Fluorosilicone Chainstopper | 118 g |
| KOH | 15-25 ppm |
| Phosphoric Acid | Quantity Sufficient to neutralize KOH |

The out-of-specification copolymer was reworked in the following manner:

Into a clean, dry vessel equipped with evacuation means, a heating element and a stirrer for moderate agitation was introduced 2290 grams out-of-specification copolymer, 750 grams of 3,3,3-trifluoropropylmethylsiloxane cyclic trimer, 160 grams of octamethylcyclotetrasiloxane and 118 grams fluorosilicone chainstopper. The system was heated to 120° C. and the octamethylcyclotetrasiloxane was sparged out with nitrogen to lower the moisture content to less than 10 ppm. With moderate agitation, sufficient potassium hydroxide was added to provide a catalyst level of 60 ppm; when the exotherm subsided, the reaction temperature was increased to 160° C. and maintained at 160° C. for six hours. The catalyst was then neutralized with phosphoric acid and the volatiles level was reduced to less than 3.0 percent by means of vacuum stripping at between 40-70 MM of mercury while the temperature of the system was held between 145° C. to 160° C.

The reworked copolymer had a recovery yield of 73.4% (2506 g) with a Brookfield viscosity of approximately 15,000 to approximately 25,000 centipoise and a density of approximately 1.1580 to approximately 1.1800 at 25° C.

While specific embodiments of the present invention have been herein described, it is not desired that the invention be limited to the particular forms described, and it is intended by the appended claims to cover all modifications within the spirit and scope of the present invention.

What is claimed is:

1. A fluorosilicone polydimethylsiloxane equilibration chainstopper composition having an empirical formula as follows:

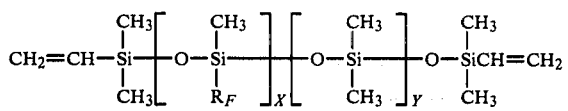

wherein $R_F$ is $CF_3CH_2CH_2-$, X is approximately 10 to approximately 30 and Y is approximately 20 to approximately 50, and having a viscosity of, approximately, 30 to 70 centipoise at 25° C. and a density of, approximately, 1.09 to 1.130.

2. A composition as in claim 1 having an approximate analytical composition of:

| Component | Weight % | Mole % |
|---|---|---|
| $CH_2=CHSiO(CH_3)_2$ | 2.0–5.0 | 2.1–5.20 |
| $(CH_3)_2SiO$ | 30–40 | 50.0–64.0 |
| $CF_3CH_2CH_2SiO(CH_3)$ | 50–60 | 34.0–41.0 |

3. A fluorosilicone polydimethylsiloxane equilibration chainstopper composition having a viscosity of, approximately, 30 to 70 centipoise at 25° C., comprising the equilibration product of:
   (a) octamethylcyclotetrasiloxane, and
   (b) 3,3,3-trifluoropropylmethylsiloxane cyclic trimer.

4. A process for producing a fluorosilicone polydimethylsiloxane chainstopper having a viscosity of, approximately, 30 to 70 centipoise at 25° C. comprising the steps of:
   (A) reacting an admixture of ingredients comprising:
      (i) 30 to 60 weight percent of 3,3,3-trifluoropropylmethylsiloxane cyclic trimer;
      (ii) 25 to 65 weight percent of octamethylcyclotetrasiloxane; and
      (iii) 5 to 15 weight percent of tetramethyldivinyldisiloxane, at a temperature of, approximately, 145° to 155° C. and in the presence of 30 to 55 parts per million alkali metal hydroxide catalyst; and
   (B) neutralizing the catalyst in the reaction mixture with phosphoric acid, after equilibration has been reached.

* * * * *